United States Patent [19]

Kar et al.

[11] Patent Number: 5,600,065
[45] Date of Patent: Feb. 4, 1997

[54] ANGULAR VELOCITY SENSOR

[75] Inventors: Barun K. Kar, Tempe; Guang X. Li; Zuoying L. Zhang, both of Gilbert; Eric D. Joseph, Chandler; Frank A. Shemansky, Jr., Phoenix, all of Ariz.

[73] Assignee: Motorola, Inc., Schaumburg, Ill.

[21] Appl. No.: 548,017

[22] Filed: Oct. 25, 1995

[51] Int. Cl.$^6$ ....................................................... G01P 9/04
[52] U.S. Cl. ..................................... 73/504.12; 73/504.02
[58] Field of Search ........................... 73/504.12, 504.02, 73/504.03, 504.04, 777; 361/280, 290; 280/735; 257/254, 417

[56] References Cited

U.S. PATENT DOCUMENTS

| | | | |
|---|---|---|---|
| 4,873,871 | 10/1989 | Bai | 73/777 |
| 5,386,726 | 2/1995 | Terajima | 73/504.16 |
| 5,392,650 | 2/1995 | O'Brien et al. | 73/514.28 |
| 5,408,877 | 4/1995 | Greiff et al. | 73/504.12 |
| 5,438,870 | 8/1995 | Zabler et al. | 73/504.02 |
| 5,503,017 | 4/1996 | Mizukoshi | 73/514.36 |
| 5,504,356 | 4/1996 | Takeuchi | 257/254 |

OTHER PUBLICATIONS

Leo O'Connor, Assoc. Editor–Mechanical Engineering, "Navigating with Gyroscopes and GPS", Nov. 1994, pp. 76–78.

Steven Ashley, Assoc. Editor–Mechanical Engineering, "Spin Control for Cars", Jun. 1995, pp. 66–68.

Primary Examiner—Christine K. Oda
Attorney, Agent, or Firm—George C. Chen

[57] ABSTRACT

Converting a Coriolis force into an electrical signal, an electro-mechanical transducer (10) is a field effect transistor (18) having angular velocity sensing capabilities. A gate electrode (16) is suspended over a channel region (60) of a substrate (31), is biased at a desired potential, and is oscillated along an axis (40). The gate electrode (16) and the substrate (31) are rotated about a different axis (41) at an angular velocity (44). The resulting Coriolis force displaces the suspended gate electrode (16) along yet another axis (42) which modulates a current (53) in the channel region (60) of the substrate (31). The amplitude of the current (53) describes the magnitude of the angular velocity (44).

19 Claims, 4 Drawing Sheets

ANGULAR VELOCITY SENSOR

BACKGROUND OF THE INVENTION

This invention relates, in general, to sensors, and more particularly, to a sensor for detecting angular velocity.

The demand for inexpensive sensor technology is rapidly growing due to the automation of navigational and other controls systems for automotive, aerospace, and consumer electronics applications. For instance, inertial sensors that detect and measure angular velocity, known in the art as yaw rate, are of particular interest. Historically, angular velocity detection has been accomplished by using expensively machined gyroscopes. However, these expensively machined gyroscopes are too costly and often do not possess the sensing accuracy required for the aforementioned applications.

Accordingly, a need exists for an angular velocity sensor that is manufacturable, accurate, and cost efficient.

DETAILED DESCRIPTION OF THE DRAWINGS

Figure 1:
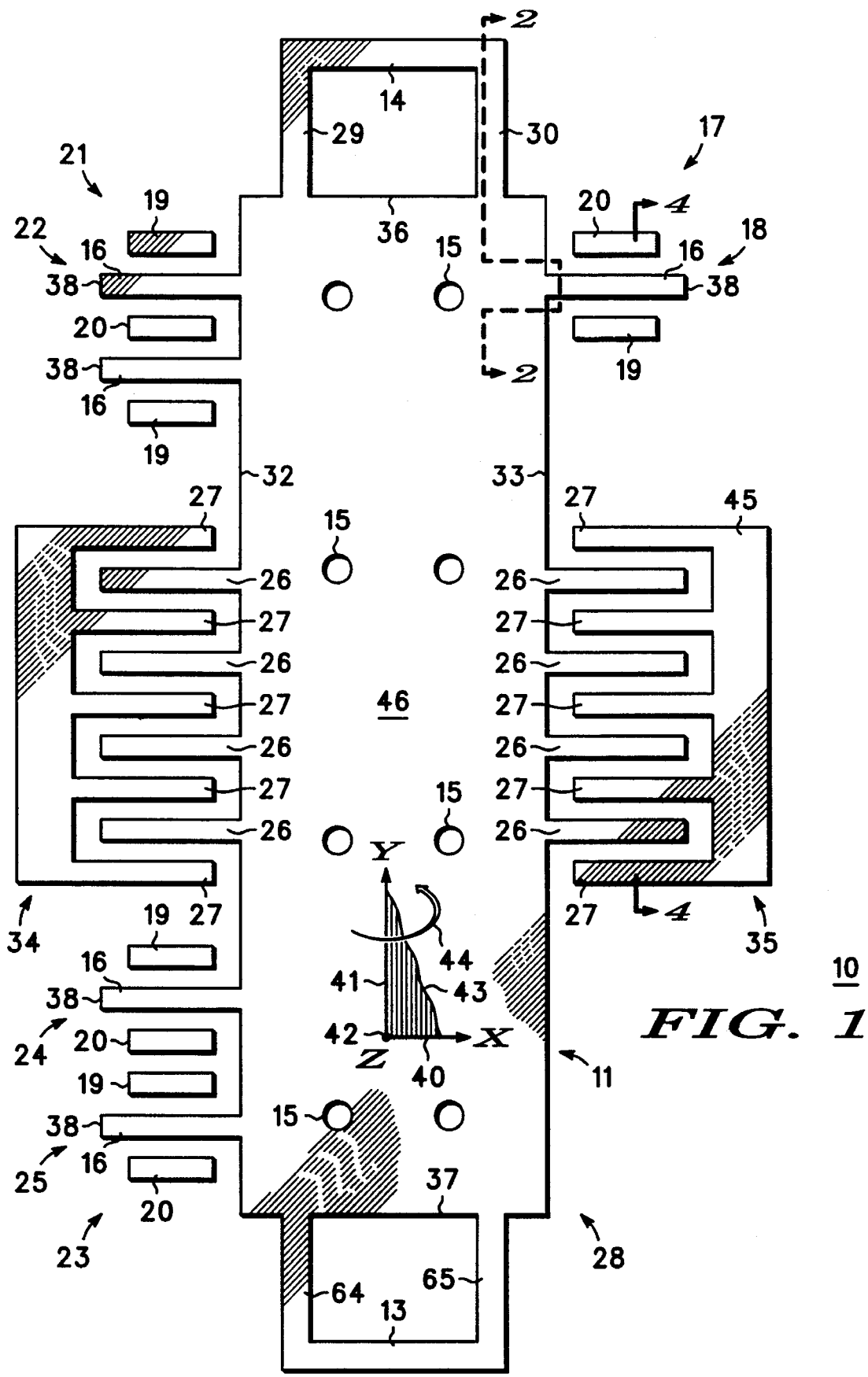
FIG. 1 illustrates an enlarged top view of an angular velocity sensor in accordance with the present invention.

Turning to the figures for a more detailed description, FIG. 1 illustrates an enlarged top view of an angular velocity sensor in accordance with the present invention. Specifically, FIG. 1 illustrates a sensor or angular velocity sensor 10, which is a rate gyroscope sensor. Sensor 10 comprises a seismic mass 11 having portions 16 and 26 that are coupled to a larger rectangular portion 46 having holes 15. Holes 15 are used to adjust the total damping coefficient of sensor 10 and are also used to provide a pathway for etching a material under seismic mass 11, which is described below. In a preferred embodiment, portion 46 is approximately 200–300 microns wide by approximately 150–250 microns long, and holes 15 have a diameter of about 5–15 microns and are spaced about 5–30 microns apart.

In the embodiment portrayed in FIG. 1, portions 16 of seismic mass 11 serve as gate electrodes for field effect transistors (FETs) 18, 22, 24, and 25. In the preferred embodiment, each of portions 16 is approximately 5–20 microns long and approximately 1–5 microns wide. Portions 16 are hereinafter referred to as gate electrodes 16. A region 17 of sensor 10 contains field effect transistor 18 that has one of gate electrodes 16 between a source contact 19 and a drain contact 20. Similarly, a region 21 of sensor 10 contains FET 22, which has a plurality of gate electrodes 16 interdigitated between a plurality of source and drain contacts 19 and 20, respectively. Likewise, a region 23 of sensor 10 includes FETs 24 and 25, each of which have at least one of gate electrodes 16 between at least one source contact 19 and at least one drain contact 20. While it is noted that a region 28 of sensor 10 does not contain an FET in FIG. 1, it is clearly understood that different combinations of FETs of varying sizes can be utilized in different regions of sensor 10. Moreover, it is also understood that FETs 18, 22, 24, and 25 can be embodied as other types of active semiconductor devices such as bipolar junction transistors, insulated gate FETs, thyristors, or the like. At a minimum, sensor 10 contains at least one active device.

Portions 26 of seismic mass 11 comprise comb fingers that are adjacent to and interdigitated between driving fingers 27. Portions or driving fingers 27 are located at regions 34 and 35 of sensor 10 and are stationary. As represented in FIG. 1, regions 21, 23, and 34 are on side 32 of seismic mass 11 while regions 17, 28, and 35 are on side 33 of seismic mass 11. Additionally, side 32 is opposite side 33. It is understood that the specific number of comb fingers 26 on each side of seismic mass 11 can vary depending on sensitivity requirements and geometric constraints. However, sides 32 and 33 each have at least one comb finger 26 and at least one driving finger 27 or electrode 45. It is further understood that the positions of comb fingers 26 and gate electrodes 16 are interchangeable and can be varied from what is depicted in FIG. 1 to create a variety of embodiments for sensor 10. In the preferred embodiment, both comb fingers 26 and driving fingers 27 are of a similar shape and size as gate electrodes 16. Additionally, comb fingers 26 and driving fingers 27 are preferably separated by approximately 1–5 microns.

Seismic mass 11 is supported at a side 36 by a suspension arm 29 and a suspension arm 30, both of which are coupled to an anchor 14. Similarly, an anchor 13 is coupled or connected to suspension arms 64 and 65, which support seismic mass 11 at a side 37 opposite side 36. Sides 36 and 37 connect sides 32 and 33 of seismic mass 11.

Figure 3:
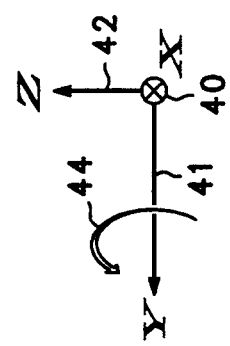
FIG. 3 represents a Cartesian coordinate system used to describe FIGS. 2 and 4.

A Cartesian coordinate system having an X-axis, a Y-axis, and a Z-axis are shown in FIG. 1 and will be described in detail below. A different view of the Cartesian coordinate system is also shown in FIG. 3 and is used to describe FIGS. 2 and 4.

Figure 2:
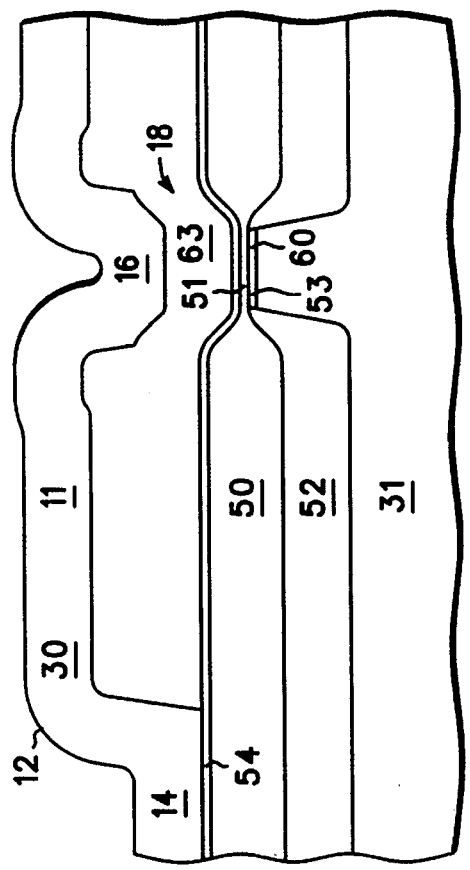
FIG. 2 portrays an enlarged cross-sectional view of a portion of the angular velocity sensor of FIG. 1 taken along reference line 2—2.

Continuing with the next figure, in accordance with the present invention, FIG. 2 portrays an enlarged cross-sectional view of a portion of angular velocity sensor 10 of FIG. 1 taken along reference line 2—2. FIG. 2 more clearly depicts anchor 14 supporting seismic mass 11 over a substrate 31 while creating an air gap 63 between substrate 31 and seismic mass 11. FIG. 2 also more clearly illustrates gate electrode 16 of seismic mass 11 located over air gap 63 and FET 18. In particular, gate electrode 16 is movably suspended over a channel region, portion, or current conducting region 60 through which a current 53 is conducted. Gate electrode 16 controls, modulates, or varies current 53 in channel region 60. As will be explained in further detail below, silicon nitride layer 54, field oxide 50, and field implant 52 are provided in and over substrate 31.

Figure 4:
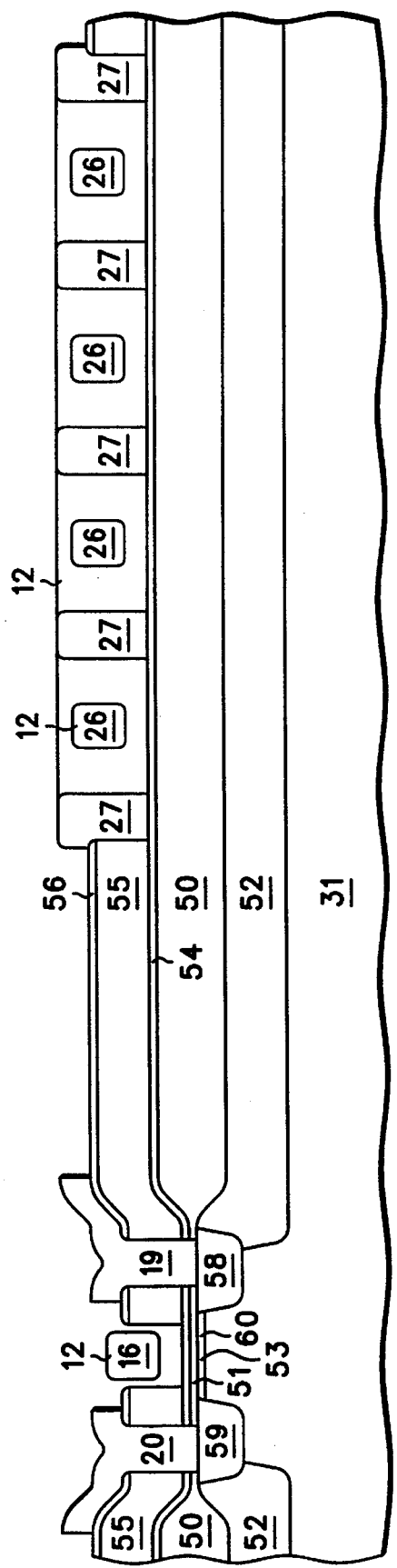
FIG. 4 represents an enlarged cross-sectional view of a different portion of the angular velocity sensor of FIG. 1 taken along reference line 4—4.

Referring now to a subsequent figure, FIG. 4 represents an enlarged cross-sectional view of a different portion of the angular velocity sensor of FIG. 1 taken along reference line 4—4 in accordance with the present invention. Again, gate electrode 16 is movably suspended over channel region 60 and is between source contact 19 and drain contact 20, which are located over substrate 31. FIG. 4 also illustrates comb fingers 26 of seismic mass 11 movably suspended over substrate 31 and interdigitated between driving fingers 27, which are located over substrate 31. Driving fingers 27 are anchored to substrate 31 at ends that are furthest away from comb fingers 26.

Figure 5:
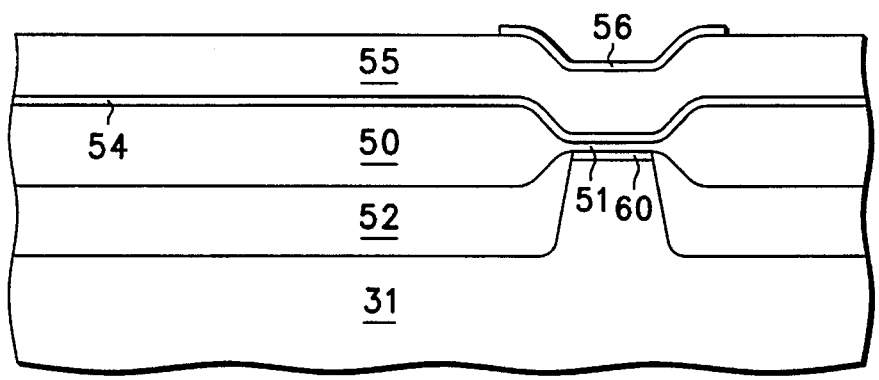
FIGS. 5, 6, and 7 depict enlarged cross-sectional views of the portion of the angular velocity sensor of FIG. 1 during fabrication taken along reference line 2—2.
Figure 6:
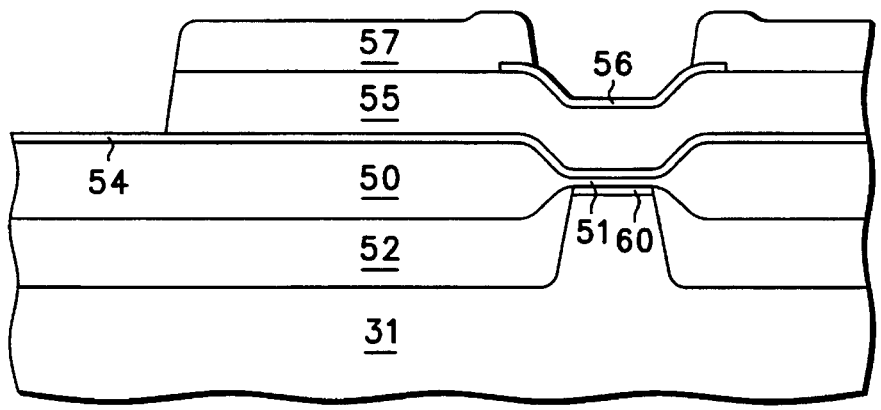
Figure 7:
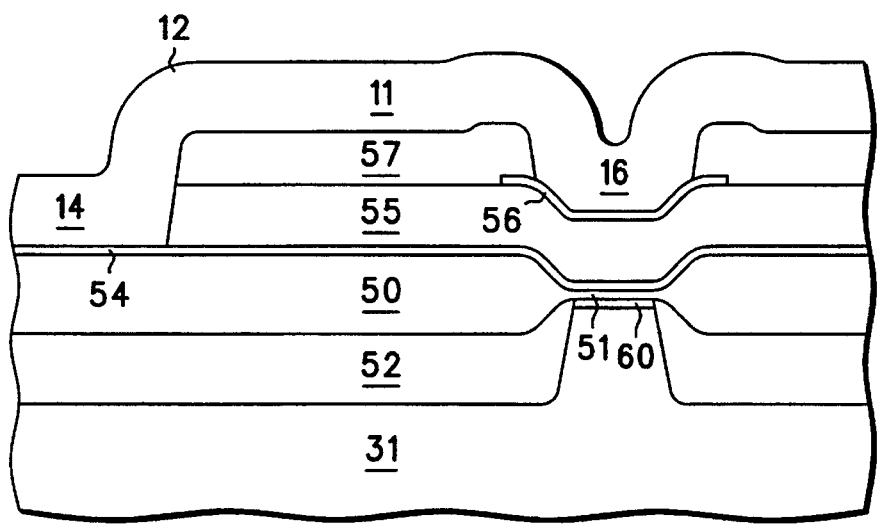

Beginning with FIG. 5, a preferred method of fabricating sensor 10 is discussed in accordance with the present invention. FIGS. 5, 6, and 7 depict enlarged cross-sectional views of the portion of the angular velocity sensor of FIG. 1 taken along reference line 2—2. It is understood that many alternative process steps not described below but known in the art can be used to manufacture sensor 10 in accordance with the present invention.

In the preferred embodiment of FIG. 5, substrate 31 comprises single crystal silicon. However, substrate 31 can alternatively comprise other suitable semiconducting materials including, but not limited to, polycrystalline silicon, gallium arsenide, or indium phosphide. A patterned photoresist layer (not shown) or a patterned silicon nitride layer (not shown) is used to define doped regions within substrate 31 during an implantation process for forming a field implant 52. Subsequently, a localized oxidation of silicon (LOCOS) technique thermally grows a field oxide 50 over field implant 52.

An additional implantation process dopes a channel region 60, which can be either n-type or p-type. Field oxide 50 or a patterned photoresist layer (not shown) can be used to define the implanted region of channel region 60. The preferred conditions for implanting channel region 60 are an implant dose of approximately $1\times10^{12}$ – $1\times10^{13}$ atoms per centimeter squared (atoms/cm$^2$) and an implant energy of approximately 20–100 kiloelectron volts (keV). If desired, a source region 58 and a drain region 59 (portrayed in FIG. 4) can be formed after channel region 60 using an ion implantation process. After forming channel 60, a gate oxide 51 is thermally grown, preferably in a dry oxygen ambient, to approximately 75–150 angstroms (Å).

Next, a silicon nitride layer 54 is disposed over substrate 31 preferably using, for example, a chemical vapor deposition (CVD) technique. Then, a silicon oxide layer 55 is provided over silicon nitride layer 54 preferably using, for example, a pyrolytic decomposition of a silane gas in a pressurized CVD chamber. Finally, in FIG. 5, a silicon nitride layer 56 is disposed over silicon oxide layer 55 using a technique similar to that of depositing silicon nitride layer 54. Another patterned photoresist layer (not shown) is used during dry or wet etching of silicon nitride layer 56. A conventional etchant such as, for example, a fluorine plasma that selectively etches silicon nitride over silicon oxide is preferably used to etch silicon nitride layer 56.

Continuing with FIG. 6, a silicon oxide layer 57 is provided over substrate 31. Yet another patterned photoresist layer (not shown) is used during dry or wet etching of silicon oxide layer 57. A conventional etchant such as, for example, buffered hydrofluoric (HF) acid, which selectively etches silicon oxide over silicon nitride, is preferably used. Accordingly, it is noted that a portion of silicon oxide layer 55, which does not have an overlying silicon nitride layer 56, is also etched during the etching process for silicon oxide layer 7. Silicon oxide layer 57 is preferably doped with about 5–10 percent phosphorous during its deposition to increase its etch rate during a subsequent etch step. Silicon oxide layer 57 is used as sacrificial spacer material and is removed during a sacrificial etch step described below.

As illustrated in FIG. 7, seismic mass 11 is formed over substrate 31 out of an electrically conductive material. Preferably, seismic mass 11 comprises approximately 10,000–35,000 Å of polysilicon 12, which is deposited using a CVD technique and which is doped with phosphorous to approximately 15–100 ohms per square to reduce series resistance. Polysilicon 12 is also used to fabricate driving fingers 27 portrayed in FIG. 1. The desired shapes of seismic mass 11 and driving fingers 27 are preferably defined by using a patterned photoresist layer (not shown) and mixture of chlorine or fluorine based plasmas in a dry etching technique. Due to its ability to produce more vertical sidewall profiles compared to fluorine based plasmas, chlorine based plasmas are preferably used to etch polysilicon 12. For reasons which will be explained later, other materials that are electrically conductive and that have a small damping coefficient can also be substituted for polysilicon 12.

Finally, returning to FIG. 2, a sacrificial wet etch is used to remove silicon oxide layers 55 and 57 and silicon nitride layer 56 that are under seismic mass 11. Holes 15 (shown in FIG. 1) of seismic mass 11 permit the wet etchant, preferably comprising buffered HF acid, to more quickly etch silicon oxide layers 55 and 57 beneath seismic mass 11. Due to its etch selectivity, the etchant for silicon oxide layers 55 and 57 does not significantly etch silicon nitride layer 54. Prior to the sacrificial wet etch process, source contacts 19 and drain contacts 20 are preferably conventionally fabricated from a deposited layer of aluminum silicon.

It is understood that sensor 10 can be fabricated simultaneously with other semiconductor devices in substrate 31. The various steps required for fabricating sensor 10 can be combined with those required for fabricating the other semiconductor devices. For instance, the deposition of polysilicon 12 can also be used for depositing gate electrodes of the other semiconductor devices in substrate 31, and the aluminum silicon layer of source and drain contacts 19 and 20, respectively, can also be used for source and drain contacts of the other semiconductor devices in substrate 31.

Figure 8:
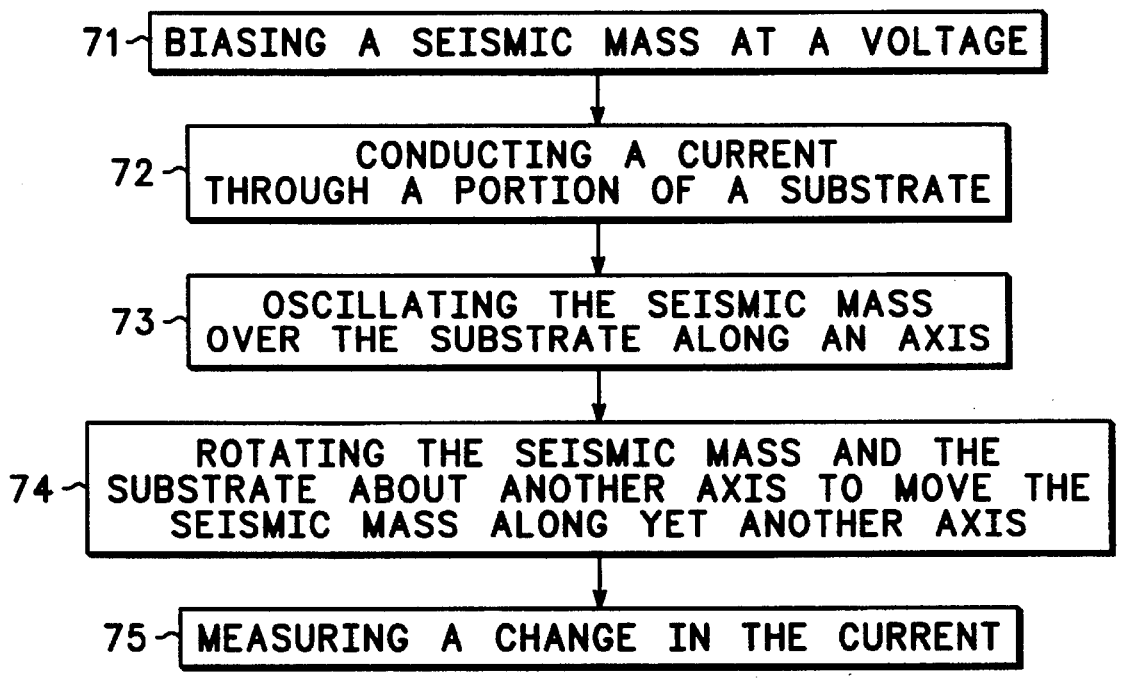
FIG. 8 outlines process steps for a method of measuring angular velocity in accordance with the present invention.

The operation of sensor 10 to detect and measure an angular velocity is outlined in five process steps as represented in FIG. 8 in accordance with the present invention. Sensor 10 measures a rotation rate, yaw rate, or angular velocity of substrate 31 around a rotation axis. For the purpose of facilitating an explanation of the operation of sensor 10, different views of a right-handed Cartesian coordinate system are depicted in FIGS. 1 and 3. The Cartesian coordinate system depicted in FIG. 3 is used to describe FIGS. 2 and 4. In particular, an X-axis, a Y-axis, and a Z-axis are labeled as an axis 40, an axis 41, and an axis 42, respectively, and are all perpendicular to each other. In FIG. 3, X-axis 40 points into the page, and in FIG. 1, Z-axis 42 points out of the page. X-axis 40 and Y-axis 41 form a plane 43, which is substantially parallel to substrate 31 and seismic mass 11 as illustrated in FIG. 1.

Step 71 of FIG. 8 first biases seismic mass 11 at an anchoring region to a desired potential or voltage. Gate electrodes 16 and comb fingers 26 are coupled to seismic mass 11 and are, therefore, also biased at the desired voltage since gate electrodes 16, comb fingers 26 and seismic mass 11 are all comprised of electrically conductive material.

Step 72 of FIG. 8 then conducts current 53 through channel 60 of substrate 31. Step 72 is accomplished by appropriately biasing source contacts 19 and drain contacts 20 of FETs 18, 22, 24, and 25 while gate electrodes 16 are biased per step 71.

Step 73 of FIG. 8 oscillates or vibrates seismic mass 11 over substrate 31 along X-axis 40. Gate electrode 16, comb fingers 26, and portion 46 of seismic mass 11 are all oscillated relative to substrate 31 and are preferably substantially stationary relative to each other during their oscillation. The oscillation amplitude of seismic mass 11 is preferably kept at a constant. Anchors 13 and 14 of seismic mass 11 are not oscillated relative to substrate 31. While seismic mass 11 is movably suspended over air gap 63 and substrate 31, the oscillation of seismic mass 11 is accomplished by using comb fingers 26 and driving fingers 27. While comb fingers 26 are biased at the desired voltage of seismic mass 11, an oscillating voltage is applied to driving fingers 27. The resulting electrostatic forces generated between comb fingers 26 and driving fingers 27 push and pull seismic mass 11 back and forth along X-axis 40. The exact biasing conditions used in steps 71, 72, and 73 are dependent upon the doping conditions of channel 60 and circuitry used with sensor 10.

Seismic mass 11 is preferably oscillated at a driving frequency that matches a natural frequency of polysilicon 12. The natural frequency is dependent upon the dimensions and other physical properties of polysilicon 12. In the preferred embodiment, the natural frequency of polysilicon 12, and thus the driving frequency of seismic mass 11, is approximately 1–10 kilohertz (kHz).

During the preferred oscillation of step 73, seismic mass 11 is moved along X-axis 40 less than approximately five microns. However, during the preferred oscillation, portions 38 of gate electrodes 16 remain beyond and are not moved in-between source contacts 19 and drain contacts 20 as illustrated in FIG. 1. By keeping a portion of gate electrode 16 over channel 60 at all times during the preferred X-axis oscillation of seismic mass 11, the X-axis vibration will not directly affect the electrical performance of FETs 18, 22, 24, and 25.

Depicted in FIG. 2, field oxide 50 of sensor 10 should not interfere with the X-axis oscillation or vibration of gate electrode 16. If field oxide 50 cannot be made thin enough to avoid obstructing the movement of gate electrode 16, then a junction isolation technique can be used to electrically isolate FETs 18, 22, 24, and 25 and to move field oxide 50 further away from gate electrode 16.

While steps 71, 72, and 73 are executed, step 74 of FIG. 8 rotates seismic mass 11 and substrate 31 about Y-axis 41. While seismic mass 11 is oscillating along X-axis 40, the rotation or change in orientation of seismic mass 11 produces a Coriolis force that displaces or moves seismic mass 11 along Z-axis 42. In the preferred embodiment, gate electrode 16 is moved approximately 30–300 Å along Z-axis 42. The Coriolis force moves gate electrode 16 of seismic mass 11 along Z-axis 42 to modulate current 53 within channel 60. The Z-axis position of gate electrode 16 determines an effective gate oxide capacitance that affects current 53. If channel 60 is n-type and if gate electrode 16 were positively biased, a higher Z-axis position for gate electrode 16 produces a lower effective capacitance and changes the threshold voltage and current 53 of FET 18. Similarly, a lower Z-axis position for gate electrode 16 produces a higher effective capacitance and changes the threshold voltage and current 53 in an opposite direction compared to that of increasing the Z-axis position of gate electrode 16. Therefore, gate electrode 16 serves as an interface transducer for converting a mechanical oscillation to an electrical signal.

The Coriolis force is a physical phenomenon related to the rotation of the Earth in which mechanical energy can be transferred between two perpendicular modes or axes. An angular velocity 44 (shown in FIGS. 1 and 3) or a change in orientation of seismic mass 11 about Y-axis 41 induces the Coriolis force on seismic mass 11 that causes a transfer of energy from a primary mode of vibration along X-axis 40 to a secondary mode of vibration along Z-axis 42. In other words, as seismic mass 11 is rotated about Y-axis 41, seismic mass 11 is also vibrated along Z-axis 42. The Coriolis force (Z-axis 42) is perpendicular to the rotation axis (Y-axis 41) and is also perpendicular to the direction of excitation (X-axis 40) of seismic mass 11.

Finally, step 75 of FIG. 8 measures a change in current 53. The rotation of seismic mass 11 in a direction identified as angular velocity 44 moves gate electrode 16, which modulates current 53 at a modulation frequency. The modulation frequency is equal to the driving frequency along X-axis 40. Specifically, in the preferred embodiment, as seismic mass 11 is rotated 360 degrees in the direction of angular velocity 44, the measurement of current 53 within channel 60 would produce one period of a sinusoidal wave function. The amplitude of the sinusoidal wave function is proportional to the magnitude of angular velocity 44. Specifically, a larger magnitude of angular velocity 44 produces a larger amplitude for the sinusoidal wave function of current 53, and a smaller magnitude of angular velocity 44 produces a smaller amplitude for the sinusoidal wave function of current 53. It is understood that if seismic mass 11 were rotated in a direction opposite to that of angular velocity 44, the measured sinusoidal wave function of current 53 would be inverted compared to that which is measured for angular velocity 44.

The frequency of the measured sinusoidal wave function can be defined by the following equation:

$$f_{response} = f_{natural} * \sqrt{1 - \xi^2} \qquad \text{(eq. 1)}$$

where $f_{response}$ is the frequency of the measured sinusoidal wave function of current 53, where $f_{natural}$ is the natural frequency of seismic mass 11, and where Å is the damping coefficient of the sensor 10, which is a function of material properties of seismic mass 11 as well as packaging pressure of sensor 10. As mentioned previously, seismic mass 11, gate electrodes 16, and comb fingers 26 are preferably comprised of a material that has a small damping coefficient. In the preferred embodiment, where a damping coefficient of approximately 0.001 to 0.0001 can be achieved by controlling packaging pressure, the response frequency is approximately equal to the natural frequency.

Increasing the number of FETs or the size of the FETs of sensor 10 can increase the sensitivity of sensor 10. Moreover, to simplify the operation of sensor 10, it is preferred to have driving fingers 27 thicker than comb fingers 26 as illustrated in FIG. 4 such that while seismic mass 11 is vibrated along Z-axis 42, comb fingers 26 do not extend above driving fingers 27. Furthermore, it is preferred to prevent comb fingers 26 and gate electrode 16 from striking the dielectric layers over substrate 31 while seismic mass 11 is vibrated along Z-axis 42.

While the invention has been particularly shown and described with reference to preferred embodiments, it will be understood by those skilled in the art that changes in form and detail may be made without departing from the spirit and scope of the invention. For instance, it is understood that the sequence or order of steps 71, 72 and 73 of process 70 in FIG. 8 can be interchanged. As an example, step 73 can be performed prior to steps 71 and 72 in accordance with the present invention. Additionally, other methods including, but not limited to, piezoelectric and magnetic techniques can be used to vibrate seismic mass 11.

Furthermore, sensor 10 can have additional features such as, for example, a self test structure and other capacitive plates beneath seismic mass 11. Yet another alternative is embodied where the gate electrodes of FETs 18, 22, 24, and 25 have multiple-tines as in a tuning fork. Moreover, it is possible to combine comb finger 26 and gate electrode 16 into a single appendage extending from portion 46 of seismic mass 11.

Therefore, in accordance with the present invention, it is apparent there has been provided an improved electro-mechanical transducer that converts a Coriolis force into an electrical signal and that overcomes the disadvantages of the prior art. Capable of measuring angular velocity, the present invention provides a combined sensor and field effect transistor that is manufacturable, cost efficient, accurate, and whose method of manufacture is compatible with existing semiconductor process flows to provide an integrated angular velocity sensor.

We claim:

1. An angular velocity sensor comprising:
   a substrate having a current conducting region;
   a seismic mass having a first portion and a second portion overlying the substrate, the first portion overlying the current conducting region to create an air gap between the first portion and the current conducting region;
   at least one electrode over the substrate and adjacent to the second portion of the seismic mass wherein the at least one electrode and the second portion of the seismic mass generate electrostatic forces to oscillate the seismic mass along a first axis substantially parallel to the current conducting region.

2. The angular velocity sensor according to claim 1, wherein the seismic mass further comprises a third portion coupled to the substrate to support the first and second portions of the seismic mass over the substrate.

3. The angular velocity sensor according to claim 2, wherein the first portion of the seismic mass is movable relative to the current conducting region and wherein the second portion of the seismic mass is movable relative to the at least one electrode.

4. The angular velocity sensor according to claim 3, wherein the first portion and the second portion of the seismic mass are substantially stationary relative to each other and wherein the first and second portions of the seismic mass are movable relative to the third portion of the seismic mass.

5. The angular velocity sensor according to claim 1, wherein the first portion of the seismic mass controls a current in the current conducting region.

6. The angular velocity sensor according to claim 5, further including a field effect transistor in the substrate, wherein a channel region of the field effect transistor comprises the current conducting region of the substrate and wherein a gate electrode of the field effect transistor comprises the first portion of the seismic mass.

7. The angular velocity sensor according to claim 1, wherein the first and second portions of the seismic mass are electrically conductive.

8. The angular velocity sensor according to claim 7, wherein the seismic mass is comprised of polysilicon.

9. The angular velocity sensor according to claim 8, wherein the first portion of the seismic mass is movable along a second axis to modulate a current in the current conducting region, the second axis substantially perpendicular to the current conducting region and the first axis.

10. The angular velocity sensor according to claim 1, wherein the second portion of the seismic mass and the at least one electrode comprise comb fingers which are inter-digitated.

11. A sensor for detecting change in orientation, the sensor comprising:
    a substrate having a field effect transistor with a gate electrode over a channel region;
    a driving finger over the substrate;
    an anchor over the substrate;
    a seismic mass supported over the substrate by the anchor and coupled to the gate electrode to control a current in the channel region, the gate electrode supported over the channel region by the seismic mass to create an air gap between the gate electrode and the channel region; and
    a comb finger coupled to the seismic mass, supported over the substrate, and adjacent to the driving finger.

12. The sensor according to claim 11, wherein the driving finger and the comb finger produce electrostatic forces to vibrate the seismic mass, the gate electrode, and the comb finger relative to the substrate.

13. The sensor according to claim 12, wherein the gate electrode is movable relative to the channel region to vary the current.

14. The sensor according to claim 11, wherein the anchor, the seismic mass, the gate electrode, the comb finger, and the driving finger are comprised of electrically conducting material.

15. The sensor according to claim 11, wherein the seismic mass has a plurality of holes.

16. The sensor according to claim 11, wherein the air gap exists between the substrate and the seismic mass and between the substrate and the comb finger.

17. An angular velocity sensor comprising:
    a substrate;
    a plurality of source contacts over the substrate;
    a plurality of drain contacts over the substrate;
    a plurality of driving fingers over the substrate;
    a seismic mass overlying the substrate, having a first side opposite a second side, and having a third side opposite a fourth side, the third side coupling the first and second sides;
    a plurality of gate electrodes coupled to each of the first and second sides of the seismic mass, each of the plurality of gate electrodes between one of the plurality of source contacts and one of the plurality of drain contacts;
    a plurality of comb fingers coupled to each of the first and second sides of the seismic mass, each of the plurality of comb fingers adjacent to at least one of the plurality of driving fingers;
    a first suspension arm coupled to the third side of the seismic mass;
    a second suspension arm coupled to the fourth side of the seismic mass;
    a first anchor over the substrate and coupled to the first suspension arm; and
    a second anchor over the substrate and coupled to the second suspension arm, the first and second anchors supporting the seismic mass, the plurality of gate electrodes, and the plurality of comb fingers over the substrate to create an air gap between the substrate and the seismic mass, the plurality of gate electrodes, and the plurality of comb fingers.

18. The angular velocity sensor according to claim 17, wherein the first and second anchors, the first and second suspension arms, the plurality of gate electrodes, and the plurality of comb fingers are comprised of polysilicon.

19. The angular velocity sensor according to claim 17, wherein the seismic mass has a plurality of holes.

* * * * *

UNITED STATES PATENT AND TRADEMARK OFFICE
CERTIFICATE OF CORRECTION

PATENT NO. : 5,600,065
DATED : February 4, 1997
INVENTOR(S) : Barun K. Kar, et al.

It is certified that error appears in the above-indentified patent and that said Letters Patent is hereby corrected as shown below:

Claim 9, column 7, line 58
delete "claim 8" and insert --claim 1-- therefor.

Signed and Sealed this

Twenty-first Day of October 1997

Attest:

BRUCE LEHMAN

Attesting Officer

Commissioner of Patents and Trademarks